United States Patent [19]

Weaver et al.

[11] 4,253,878

[45] Mar. 3, 1981

[54] LIGHT PROTECTIVE BOTTLE GLASS

[75] Inventors: Robert L. Weaver, Montreal West; Alastair M. Jamieson, Montreal, both of Canada

[73] Assignee: The Molson Companies Limited, Toronto, Canada

[21] Appl. No.: 106,936

[22] Filed: Dec. 26, 1979

[30] Foreign Application Priority Data

May 22, 1979 [CA] Canada .................................... 328016

[51] Int. Cl.³ .......................... C03C 3/04; C03C 3/30
[52] U.S. Cl. ...................................... 106/52; 106/54; 106/47 R
[58] Field of Search .............................. 106/52, 54

[56] References Cited

U.S. PATENT DOCUMENTS

| Re. 25,456 | 10/1963 | Bacon et al. | 106/52 |
| 2,693,422 | 11/1954 | Duncan et al. | 106/52 |
| 3,024,121 | 3/1962 | Hagedorn | 106/52 |

Primary Examiner—Helen M. McCarthy
Attorney, Agent, or Firm—Anthony J. Casella

[57] ABSTRACT

A light protective bottle glass for use in beer bottles to prevent or reduce flavor deterioration by exposure to light is prepared by adding 0.065 percent by weight of nickel oxide to the Ultraviolet Absorbing Green glass usually used in green beer bottles.

1 Claim, 1 Drawing Figure

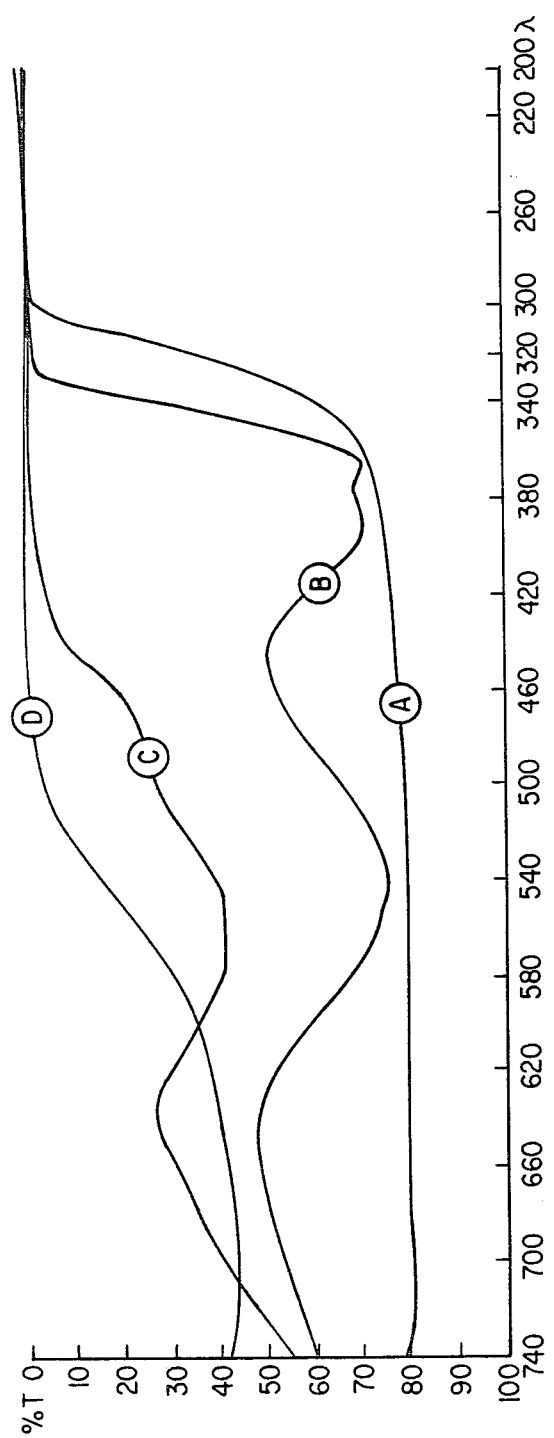

LIGHT PROTECTIVE BOTTLE GLASS

This invention relates to a light protective glass and in particular to a light protective bottle glass for use in beer bottles.

Canadian beer is usually bottled in amber bottles, which greatly reduces the occurrence of so-called "skunky" or "light-struck" off-flavours in beer.

The usual containers for European beers sold in the United States are green. Accordingly, in order to compete against such beers, the usual containers for Canadian beers exported to the U.S. are green, non returnable bottles. Moreover, green bottles are demanded by certain breweries, because such bottles are usually clear, making it easy to determine whether the beer is clean.

It has been found that the use of green bottles for beer presents many problems with respect to the prevention of skunky off-flavours. Beer in green bottles is susceptible to light damage and display cabinets in the U.S. are often lighted by fluorescent tubes. The simple solutions of using amber bottles, totally enclosed six packs or high coverage labelling or wrapping are unacceptable to the distributor because he wishes to maintain the imported image of the green bottle. Moreover, the bottles of a six pack are often separated for display purposes.

As a result of the foregoing, it is readily apparent that there is a definite need for a green bottle glass which is light protective, i.e. which reduces the incidence of skunky off-flavours.

Accordingly, the invention relates to a light protective bottle glass comprising an Ultraviolet Absorbing Green glass in combination with a metallic oxide capable of reducing the tranmission of light having wavelengths in the range of 450 to 500 nm while imparting a green colour to the glass.

Specifically, the metallic oxide added to the glass is nickel oxide, which is added in an amount of 0.065% by weight.

The Ultraviolet Absorbing Green glass referred to above is a standard bottle glass type.

Tests by applicant have shown that the damaging wavelengths are in the 450 to 500 nm region. While they do not form part of the present invention, it is worth noting that the test procedures involve the use of sharp cutoff and narrow bandpass filters, the transmission profiles of which enable applicant to determine the wavelengths at which flavour deterioration occurs.

The tests also proved that a green colour in glass can provide flavour protection. Beer in flint (colourless) bottles protected by a green filter having a bandpass from 500 to 600 nm was exposed to light, and no skunkiness was detected at the end of 24 hours.

The invention will now be described in greater detail with reference to the accompanying drawing, the single FIGURE of which is a graph of percentage transmission versus wavelength in millimicrons for a variety of glasses.

Referring to the drawing, it will be noted that clear or flint glass (curve A) possesses the highest degree of transmission in the damaging wavelength range of 450 to 500 nm. As suggested hereinbefore, amber glass (curve D) transmits the least amount of light in the damaging wavelength range. The percentage transmission of ordinary green glass used in bottles for Canadian beers exported to the U.S. (curve B) is intermediate those of flint and amber closes, but closer to that of the flint glass. In other words, the degree of transmission of the ordinary green glass in the damaging wavelength range is unacceptably high. Finally, the transmission values for the glass of the present invention (curve C) are much more acceptable than those for the ordinary green glass and are close to the values for amber glass in the damaging wavelength range.

The glass having the satisfactory percentage transmission curve was prepared by adding nickel oxide to so-called Ultraviolet Absorbing Green glass. The nickel oxide was used in an amount of 0.065 percent by weight of the glass composition.

Of course, other metallic salts can be added to the green glass, the important point being that the glass must block or substantially reduce light transmission in the damaging wavelength range of 450 to 500 nm.

We claim:

1. A light protective bottle glass comprising an Ultraviolet Absorbing Green glass in combination with nickel oxide in the amount of 0.065% by weight based on the weight of said glass, said nickel oxide being capable of blocking or substantially reducing the transmission of light having wavelengths in the range of 450 to 500 nm while imparting additional green color to the glass.

* * * * *